Dec. 3, 1929.    W. WEBBER    1,737,816
BEARING BOX
Filed June 30, 1926

Inventor:
William Webber,
By W. P. Doolittle
Atty.

Patented Dec. 3, 1929

1,737,816

UNITED STATES PATENT OFFICE

WILLIAM WEBBER, OF LA GRANGE, ILLINOIS, ASSIGNOR TO INTERNATIONAL HARVESTER COMPANY, A CORPORATION OF NEW JERSEY

BEARING BOX

Application filed June 30, 1926. Serial No. 119,555.

This invention has reference to a self contained, unitary bearing box.

The bearing box herein shown and described is particularly useful in connection with the mounting of wooden conveyor roller shafts of the type generally employed in the conveying mechanisms of grain harvesting machinery. In the rush of harvest, conventional bearing boxes for these roller shafts sometimes give out and the necessity for replacement arises. A self contained bearing box which can be ordered as a repair part and be replaced as a unit is thus very desirable.

The objects of this invention are to provide a cheap, simple and efficient bearing box of this nature, and to provide a simple method for assembling such a box as a unit.

Briefly, these desirable objects are accomplished in the provision of a bearing box comprising a circular sleeve, having a reduced closed end, and an open end. Inserted through the open end, the sleeve carries a roller bearing, spaced between suitable washers, said assembly being completed as a unit, by deforming the edge of the open end of the sleeve to lock the parts together.

Looking now to the drawings,—

Figure 1:
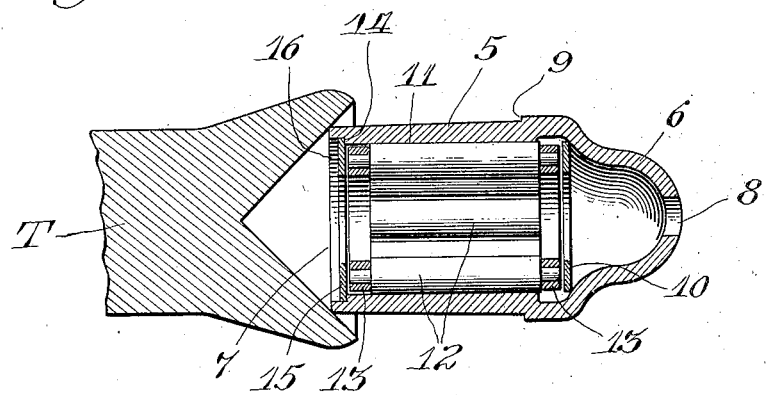
Figure 1 is a sectional view of the bearing box and also showing a spinning tool which closes the box.
Figure 2:
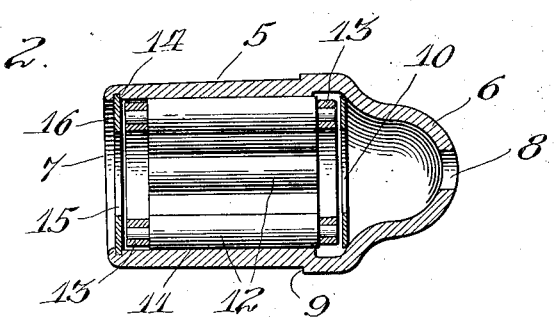
Figure 2 is a sectional view of the finished bearing box.
Figure 3:
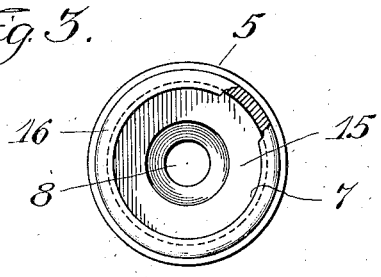
Figure 3 is a view of the open end of the bearing box.

In the illustrative embodiment of this invention, herein disclosed, there is provided a circular sleeve 5, having a reduced conically shaped closed end 6, and an open end 7. The reduced end 6 is provided with an axial aperture 8, for a purpose later to appear.

The sleeve is formed on its exterior side with an annular shoulder 9 which forms an abutment when mounting the box in a frame member, not shown. At the reduced end 6, the sleeve loosely carries a washer 10, and in its body a roller bearing 11, comprising a circular series of rollers 12 assembled in end retainer rings 13.

The open end of the sleeve 5 is formed with an internal, annular shoulder 14, against which is fitted a second washer 15, as shown, in such a manner that a reduced part 16 of the sleeve 5 is left in the form of a projected edge.

A spinning tool T is then utilized to swage, or deform this edge 16, as shown, to form an overhanging flange functioning securely to retain the washer 14 in place and hold the parts together as a unitary bearing box.

In assembling, the first washer is placed in the sleeve, then the roller bearing, and lastly the second washer. The final step is to deform the free, reduced edge, as explained, and the result is a unitary bearing box which can be handled, as a repair part, complete in itself. The open end, as will be understood, may receive the usual gudgeon pin of a roller shaft, such as used, for example, in harvesters, whereby the device serves as a bearing box for such shafts. The hole 8 serves as a means for receiving lubricant to supply the same to the reduced extension which forms an oil chamber to oil the bushing.

It can now be appreciated that a simple, self contained and unitary bearing box has been provided, which achieves the desirable objects heretofore stated.

This invention is susceptible of changes, of course, and it is the intention to cover all such changes which do not depart from the spirit and scope of this invention as indicated in the subjoined claim.

What I claim is:

As a self-contained replacement unit, a bearing box comprising a cup-shaped, cylindrical sleeve open at one end to receive a shaft and closed at its other end by a substantially conically shaped integral reduced extension provided with a lubricant filler opening to supply the same to the extension which forms a lubricant chamber, a loose washer in the sleeve and abutting the start of said extension, a roller bearing in the sleeve, a shoulder in the sleeve adjacent its open end, a flat washer in the sleeve abutting said shoulder, and a deformed end on the sleeve to lock said last mentioned washer in place to complete the said self-contained replacement unit.

In testimony whereof I affix my signature.

WILLIAM WEBBER.